United States Patent [19]

Levy et al.

[11] Patent Number: 4,778,579
[45] Date of Patent: Oct. 18, 1988

[54] METHOD AND APPARATUS FOR OPERATING A FUEL CELL IN COMBINATION WITH AN ELECTROCHEMICAL CELL TO PRODUCE A CHEMICAL PRODUCT

[75] Inventors: Alexander H. Levy, Bloomfield; Kenneth Lipman, West Hartford, both of Conn.

[73] Assignee: United Technologies Corporation, Hartord, Conn.

[21] Appl. No.: 27,041

[22] Filed: Mar. 20, 1987

Related U.S. Application Data

[63] Continuation of Ser. No. 501,238, Jun. 3, 1983, abandoned.

[51] Int. Cl.$^4$ .................. C25B 1/02; C25B 15/00; H01M 8/06
[52] U.S. Cl. .................. 204/129; 204/228; 429/17; 429/23
[58] Field of Search ............. 429/17, 19, 23; 204/129, 228

[56] References Cited

U.S. PATENT DOCUMENTS

| | | | |
|---|---|---|---|
| 3,180,813 | 4/1965 | Wasp et al. | 429/12 |
| 3,622,490 | 11/1971 | Lockett | 204/220 |
| 4,084,038 | 4/1978 | Scragg et al. | 429/17 |
| 4,276,145 | 6/1981 | Skala | 204/247 |
| 4,411,967 | 10/1983 | Yano | 429/23 |

FOREIGN PATENT DOCUMENTS 966429  8/1964  United Kingdom .............. 204/1.07

OTHER PUBLICATIONS

"Energy Saving in Chlorate Production with the use of the Fuel Cell", I. H. Warren; Jun. 3, 1982.

*Primary Examiner*—Donald L. Walton
*Attorney, Agent, or Firm*—Gene D. Fleischhauer

[57] ABSTRACT

A method and apparatus is disclosed for operating a fuel cell 14 which produces electrical energy in combination with an electrochemical cell 12 which uses electrical energy to produce a chemical product. A direct current converter 16 intermittently passes electrical power from the fuel cell to the electrochemical cell to enable the fuel cell to operate at a desired voltage which is independent of the voltage for the electrochemical cell. This permits the fuel cell to operate within a schedule of desired operating voltages.

26 Claims, 7 Drawing Sheets

4,778,579

METHOD AND APPARATUS FOR OPERATING A FUEL CELL IN COMBINATION WITH AN ELECTROCHEMICAL CELL TO PRODUCE A CHEMICAL PRODUCT

CROSS-REFERENCES TO RELATED APPLICATIONS

This is a continuation of application Ser. No. 501,238, filed June 3, 1983 which is now abandoned.

DESCRIPTION

1. Technical Field

This invention relates to a method for operating a fuel cell which produces electrical energy in combination with an electrochemical cell which uses electrical energy. More particularly, this invention is directed to a method and apparatus for permitting the fuel cell and electrochemical cell to operate at voltages which are independent of each other. This invention has application to all types of fuel cells including acid, base, solid electrolyte and molten carbonate fuel cells and to all types of electrochemical cells including cells that produce a reactant for the fuel cell and cells that do not produce a reactant for the fuel cell.

2. Background Art

A fuel cell is an electrochemical cell which consumes fuel and an oxidant on a continuous basis to generate electrical energy. The fuel is consumed at an anode and the oxidant at a cathode. The anode and cathode are placed in electrochemical communication by an electrolyte. One typical fuel cell employs a phosphoric acid electrolyte. The phosphoric acid fuel cell uses air to provide oxygen as an oxidant to the cathode and uses a hydrogen rich stream to provide hydrogen as a fuel to the anode. After passing through the cell, the depleted air and fuel streams are vented from the system on a continuous basis.

A typical fuel cell power plant comprises one or more stacks of fuel cells, the cells within each stack being connected electrically in series to raise the voltage potential of the stack. A stack may be connected in parallel with other stacks to increase the current generating capability of the power plant. Depending upon the size of the power plant, a stack of fuel cells may comprise a half dozen cells or less, or as many as several hundred cells. Air and fuel are usually fed to the cells by one or more manifolds per stack. Examples of typical fuel cell power plants are shown in U.S. Pat. No. 3,585,078 issued to Sederquist et al. entitled "Method Of Reformer Fuel Flow Control", U.S. Pat. No. 3,976,507 issued to Bloomfield entitled "Pressurized Fuel Cell Power Plant With Single Reacting Gas Stream"; and U.S. Pat. No. 4,202,933 issued to Riser, et al. entitled "Method For Reducing Fuel Cell Output Voltage To Permit Low Power Operation". The information contained in these patents is incorporated herein by reference.

Fuel cell components are designed to operate within a band of predetermined voltages. Voltages above the predetermined maximum are avoided in acid cells because excessive voltages may damage internal equipment and cause excessively fast corrosion of components such as the cathode. In all fuel cells, such high voltages result in low power densities and uneconomical operation of the power plant. Voltages below a predetermined minimum are avoided because such low voltages adversely affect the efficiency of the fuel cell causing the fuel cell to require a larger amount of fuel for a given amount of power.

As shown in FIG. 2, fuel cells typically produce electrical energy with a voltage characteristic that decreases as current increases. This graphical representation of voltage and current is often referred to as the voltage characteristic of the fuel cell. The voltage drops with increasing current because of ohmic and polarization losses. In addition, there is a voltage loss with time due to the slow deterioration of catalysts used at the anode and cathode of the fuel cell.

This decreasing voltage characteristic of fuel cells causes difficulties in directly coupling the fuel cell to an electrochemical cell to perform an electrochemical process. Examples of electrochemical cells that use electrical energy to produce a chemical product such as chlorine or caustic alkalis are shown in U.S. Pat. No. 4,031,000 issued to Nakamura et al. entitled "Diaphragm For Electrolytic Production Of Caustic Alkali", in U.S. Pat. No. 4,272,337 issued to Darlington entitled "Solid Polymer Electrolyte Chlor-Alkali Electrolysis Cell" and in U.S. Pat. No. 4,273,626 entitled "Electrolyte Series Flow In Electrolytic Chlor-Alkali Cells", the information in which is incorporated herein by reference.

These electrochemical processes typically employ an electrochemical cell having a voltage characteristic which is opposite in nature to the voltage characteristic of the fuel cell. In these cells, the production of the saleable product is directly proportional to the flow of current through the cells. As shown in FIG. 2, increasing voltages are required as the flow of electrical current is increased through the electrochemical cell to produce more product. The increasing voltages are needed to overcome ohmic and polarization losses in the electrochemical cell and other losses which are similar to the losses occuring in a fuel cell. Thus, as the current and power consumption is increased in the electrochemical cell to produce more chemical product at an efficient operating point, the voltage increases. As the power supplied by the fuel cell increases to meet this demand, the operating voltage of the individual cells is decreased.

Accordingly, scientists and engineers are seeking a way to match the performance of a fuel cell to an electrochemical cell to combine the two cells in a cycle and yet to allow the fuel cell to operate at a voltage most beneficial to the fuel cell and the electrochemical cell to operate at a voltage most beneficial to the electrochemical cell.

DISCLOSURE OF INVENTION

According to the present invention, an electrochemical cell using electrical power at a first voltage to produce a chemical product and a fuel cell using fuel to produce electrical power at a second voltage are linked by a device allowing the fuel cell to operate at the second voltage and the electrochemical cell to operate at the first voltage.

In accordance with one embodiment of the invention, the electrochemical cell produces fuel which is consumed in the fuel cell.

In accordance with the present invention, an electrochemical cell is operated at a first current and a first voltage to produce a chemical product and a fuel cell is operated at a second voltage and a second current to produce power for the electrochemical cell by converting the power output of the fuel cell to a current and output voltage which matches the voltage of the electrochemical cell.

A primary feature of the present invention is a electrochemical cell which uses power to produce a chemical product efficiently at a first voltage. Another feature is a fuel cell which utilizes a fuel and an oxidant to produce electrical power efficiently at a second voltage. Another feature is a device for regulating the electrical power received from the fuel cell. The device is connected to the fuel cell and electrochemical cell. In one embodiment the electrochemical cell is a chloralkali cell. In another embodiment the device for regulating electrical power includes a direct current converter having a duty cycle to provide for the intermittent flow of current through the direct current converter. The converter may be responsive to voltage, (i.e., a voltage regulator) or responsive to current (i.e., a current regulator).

A primary advantage of the present invention is the efficiency which results from carrying out an electrochemical process by combining a fuel cell with an electrochemical cell and allowing the fuel cell and the electrochemical cell to operate at preferred voltages and currents independent of each other. In one embodiment, an advantage is the efficient utilization of a by-product of the electrochemical process as fuel in the fuel cell. In one embodiment, an advantage is the reduction in the average cost of electrical power by supplementing electrical power supplied from an outside source with power provided by the fuel cell.

The foregoing features and advantages of the present invention will become more apparent in the light of the following detailed description of the best mode for carrying out the invention and in the accompanying drawing.

BEST MODE FOR CARRYING OUT THE INVENTION

Figure 1:
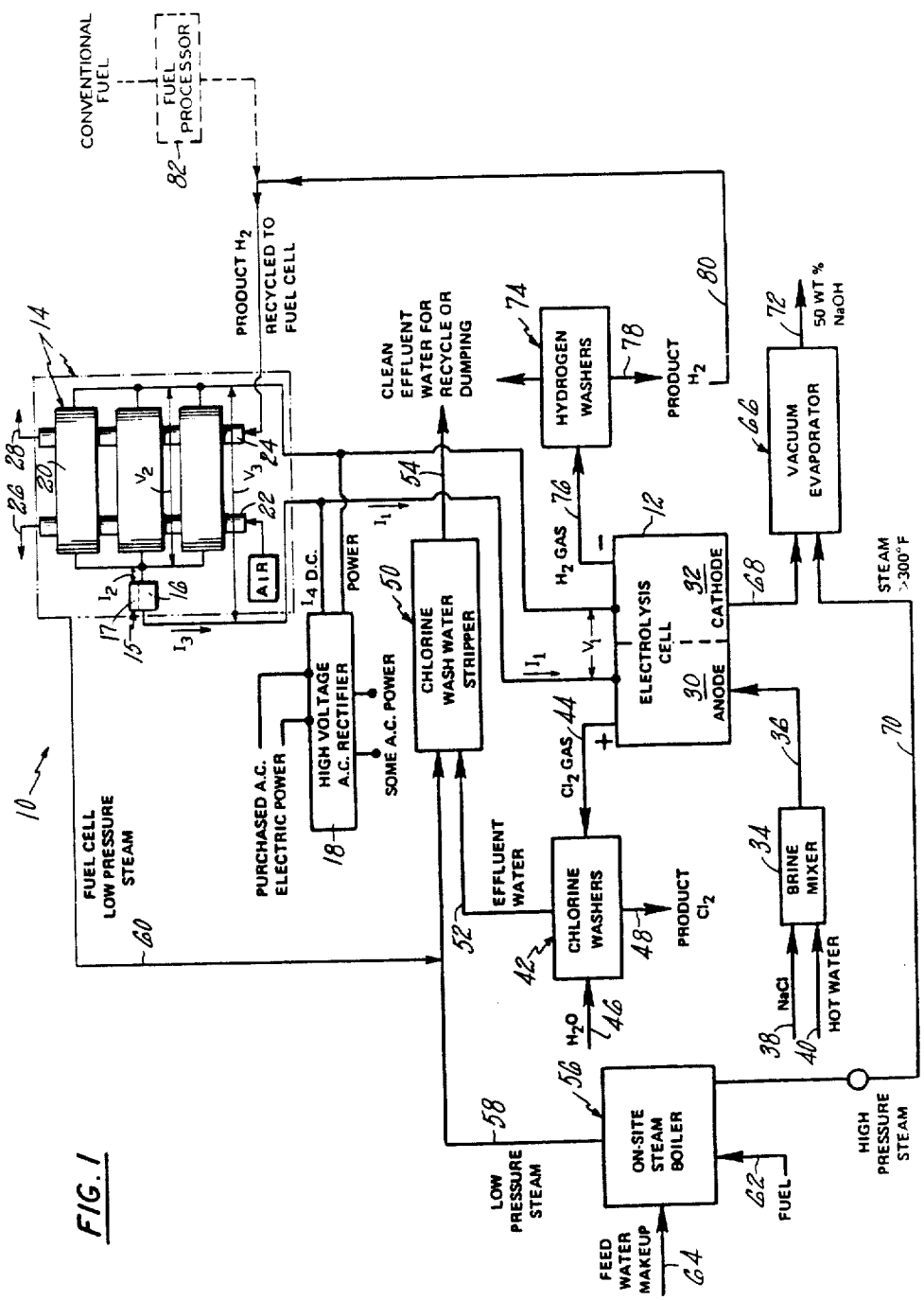
FIG. 1 is a diagrammatic representation of an apparatus for carrying out an electrochemical process, the apparatus including an electrochemical cell and a fuel cell.

FIG. 1 is a schematic representation of an embodiment of the present invention showing an apparatus 10 for carrying out an electrochemical process to produce a chemical product. The apparatus employs a chloralkali electrochemical electrolysis cell 12 and an electrochemical fuel cell 14 to produce chlorine and sodium hydroxide. The term fuel cell includes a single fuel cell, a fuel cell stack formed of a plurality of fuel cells, and a fuel cell power plant formed of one or more fuel cell stacks. Similarly the term electrochemical cell or electrolysis cell includes a single electrochemical cell, an electrochemical cell stack formed of a plurality of electrochemical cells, and an electrochemical plant formed of one or more electrochemical stacks.

Regulator means for regulating the power received from the fuel cell 14 to adjust the voltage and current of said power and for supplying the power to the electrolysis cell are connected to the fuel cell and to the electrolysis cell. An example of such a means is a direct current regulator 15 having a direct current converter 16 and a control means 17. The direct current converter is connected to both the fuel cell and the electrolysis cell. A high voltage, AC rectifier 18 is in electrical communication with a source of purchased electric power. The rectifier is capable of supplying direct current power to the electrolysis cell under selected operating conditions. Under such operating conditions the fuel cell supplies at least a portion of the power required by the electrochemical cell.

The fuel cell 14 shown in FIG. 1 is formed of at least one individual fuel cell and in fact is a power plant which includes pluralities of fuel cells stacked in series to form fuel cell stacks 20. The fuel cell stacks are connected electrically in parallel to form the power plant. The fuel cell includes a manifold 22 and a manifold 24 for supplying reactant gases to the fuel cell. A flow path 26 for oxidant rich gas stream, such as air, extends through the manifold 22 and a flow path 28 for fuel rich gases, such as a hydrogen rich gas stream, extends through the stacks to provide the cathode of each cell with an oxidant and the anode of each cell with fuel. Under normal operating conditions the fuel cell will not consume all of the oxidant in the oxidant stream nor will the fuel cell consume all of the fuel in the fuel stream.

The electrolysis cell 12 has an anode side 30 and a cathode side 32. A brine mixer 34 is connected to the anode side via conduit 36. The brine mixer receives sodium chloride via conduit 38 and hot water via conduit 40 to form brine. A plurality of chlorine washers 42 are connected to the anode side by conduit 44. The chlorine washers receive water via conduit 46 and discharge product chlorine via conduit 48. A stripper 50 for the chlorine wash water is connected to the chlorine washers by conduit 52. The stripper discharges clean water for recycling or dumping via conduit 54. An on-site steam boiler 56 is in flow communication with the stripper via conduit 58. The stripper also receives steam from the fuel cell via conduit 60. Alternatively, the conduit 60 might be connected to other components requiring steam, such as the brine mixer 34 or other components requiring heat.

The on-site steam boiler 56 receives fuel via conduit 62 and feed water via conduit 64. A vacuum evaporator 66 for processing sodium hydroxide received from the cathode side of the electrolysis cell via conduit 68 also receives high pressure steam from the boiler via conduit 70. The temperature of the steam is greater than 300° F. The vacuum evaporator discharges fifty percent by weight sodium hydroxide via conduit 72. A hydrogen washer 74 receives hydrogen gas from the cathode side of the electrolysis cell via conduit 76. The hydrogen discharges water via conduit 78 and supplies the fuel cell 14 with a hydrogen rich fuel stream via conduit 80. The conduit 80 is connected to the hydrogen manifold 24 of the fuel cell.

Other electrochemical cells might be used in conbination with the fuel cell 14. One example is a chlorate electrolysis cell which uses input electrical power to produce a chlorate product and hydrogen. As with the chlor-aklaki process, hydrogen is produced at the cathode and the chlorate product is produced as a result of the electrochemical process at the anode. The product is sent to a reactor for further processing. The hydrogen is preferably processed through a hydrogen washer before being sent to the fuel cell. The chemical reactions are summarized as follows:

ELECTROLYSIS CELL $NaCl \rightarrow Na^+ + cl^-$ $Cl^- \rightarrow \tfrac{1}{2}Cl_2 + e^-$ Anode $\tfrac{1}{2}Cl_2 + H_2O + e^- \; ClO^- + H_2$ Cathode $Na^+ + ClO^- \; NaOCl$

REACTOR $NaOCl \rightarrow \tfrac{1}{3}Na\,ClO_3 + \tfrac{2}{3}NaCl$

This electrochemical process was discussed in a paper presented at the International Chlorine Symposium 1982 on June 3, 1982 in London, England entitled "Energy Saving In Chlorate Production With The Use Of The Fuel Cell" by I. H. Warren. The paper is available from the Chemetics International Company, a division of C-I-L Inc, 1818 Cornwall Ave., Vancouver, B.C., Canada, the material in which is hereby incorporated by reference.

Another electrochemical cell having a useful by-product is an electrolysis cell used in the production of adiponitrile. This electrochemical process was discussed in an article entitled "Adiponitrile" contributed by the Asahi Chemical Industry Co., Ltd. and appearing in the November 1977 issue of Hydrocarbon Processing published by the Gulf Publishing Co., U.S.A., the material in which is herein incorporated by reference. This cell produces oxygen, a by-product. The oxygen in a combined cycle is sent to the fuel cell for consumption in the cathode of the fuel cell. Preferably the oxygen will pass through an oxygen washer. In other cells, chlorine may be sent to a fuel cell which uses chlorine as an oxidant. The by-product of generation of such a fuel is hydrogen chloride.

Figure 2:
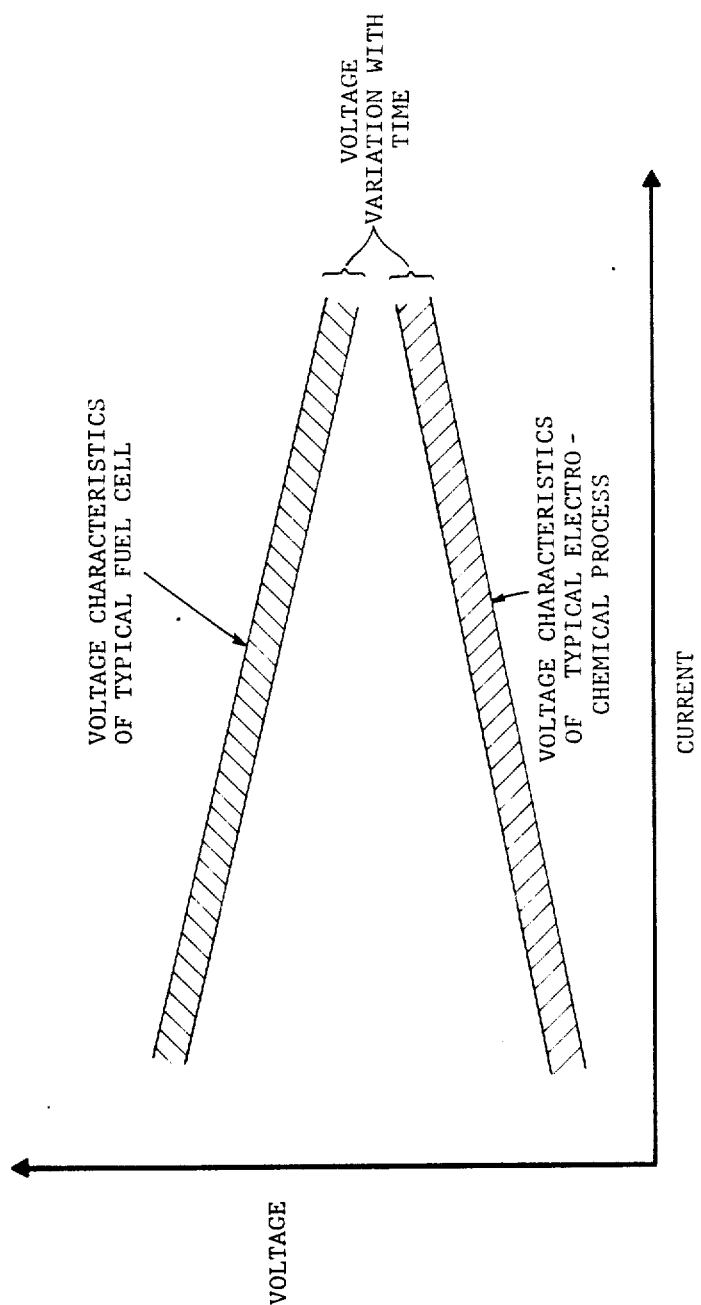
FIG. 2 is a graphical representation of the voltage characteristic of a typical fuel cell and the voltage characteristic of a typical electrochemical cell.

FIG. 2 is a graphical representation characterizing in general the voltage characteristic of a typical fuel cell and the voltage characteristic of a typical electrochemical process employing an electrolysis cell. As shown, a fuel cell has a decreasing voltage characteristic with current. An electrochemical cell has an increasing voltage characteristic with current. As discussed earlier, these voltage characteristics are not compatible if variations in the operating characteristics of either cell changes, as they most certainly will. For example, there is a voltage variation with time for each cell during operation because of the natural degeneration of the cells.

Figure 3:
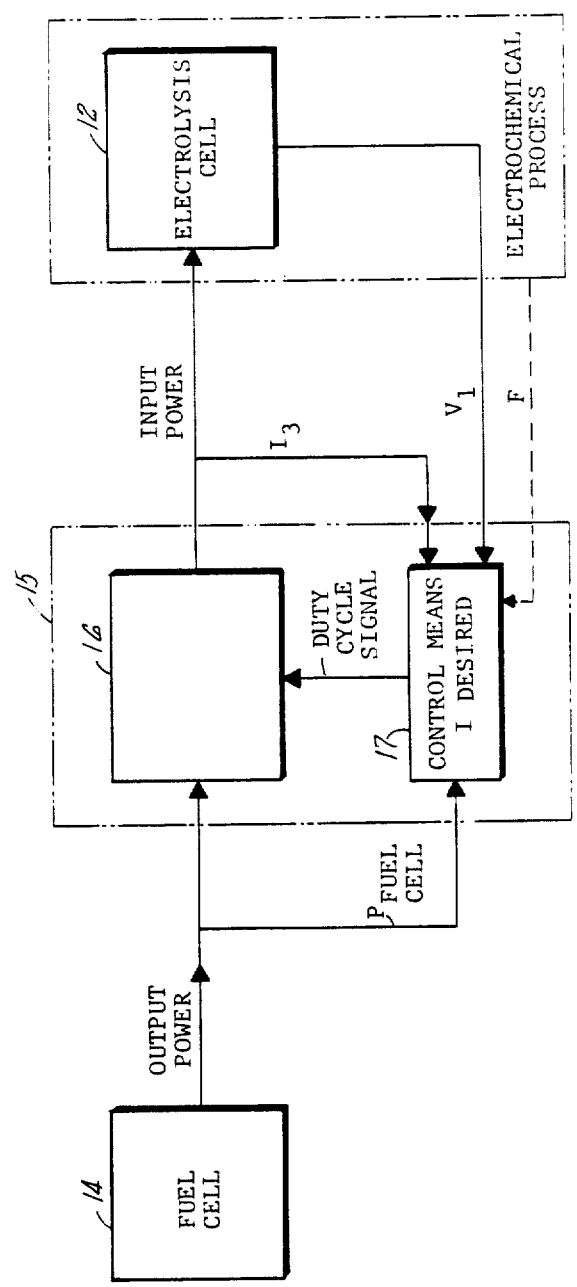
FIG. 3 is a diagrammatic representation of the relationship between the fuel cell, the electrochemical cell and regulator means connected to the fuel cell and the electrochemical cell.
Figure 8:
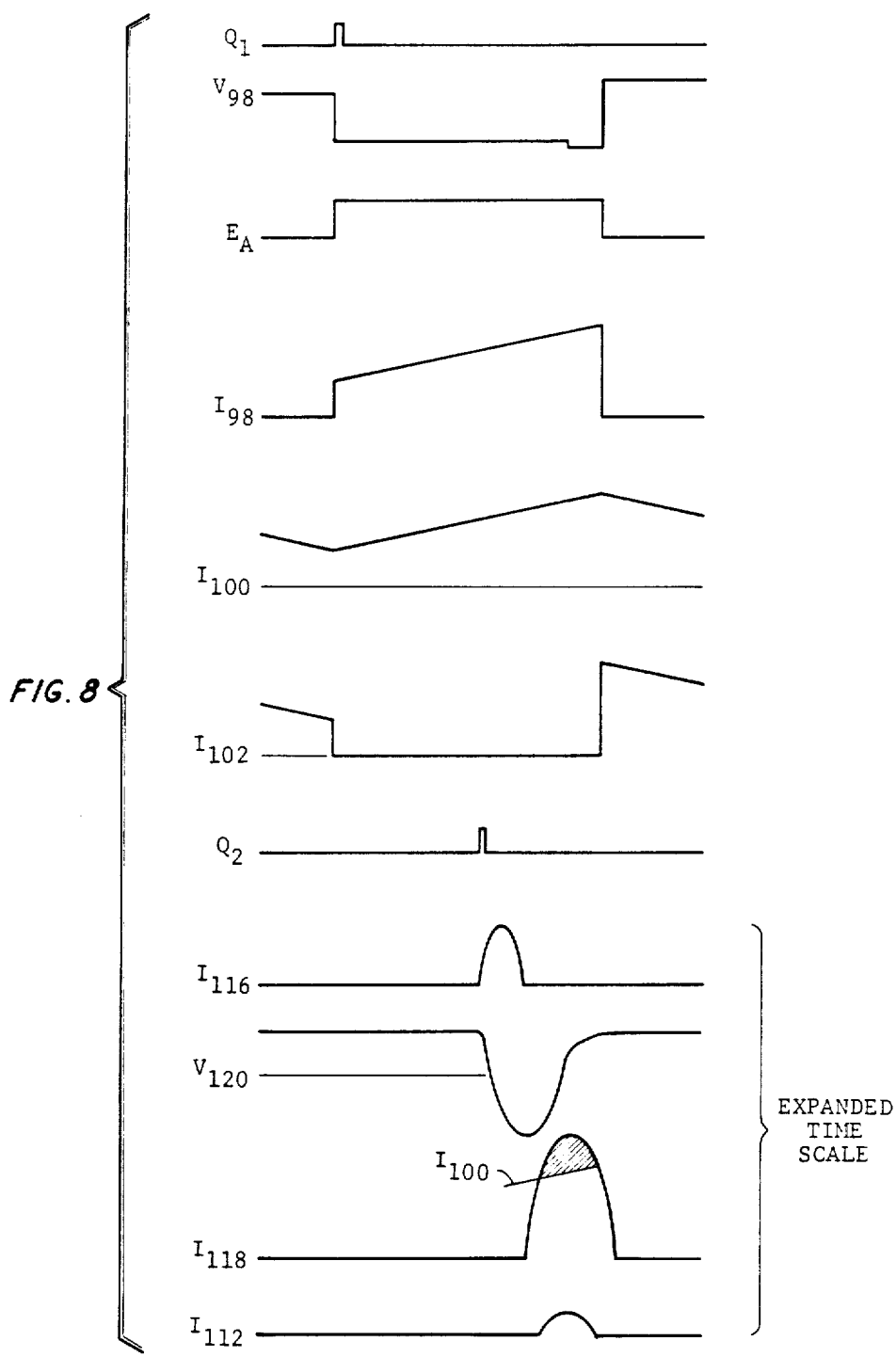
FIG. 8 is a graphical representation illustrative of wave forms used to explain the operation of the direct current converter shown in FIG. 4 and FIG. 6
Figure 9:
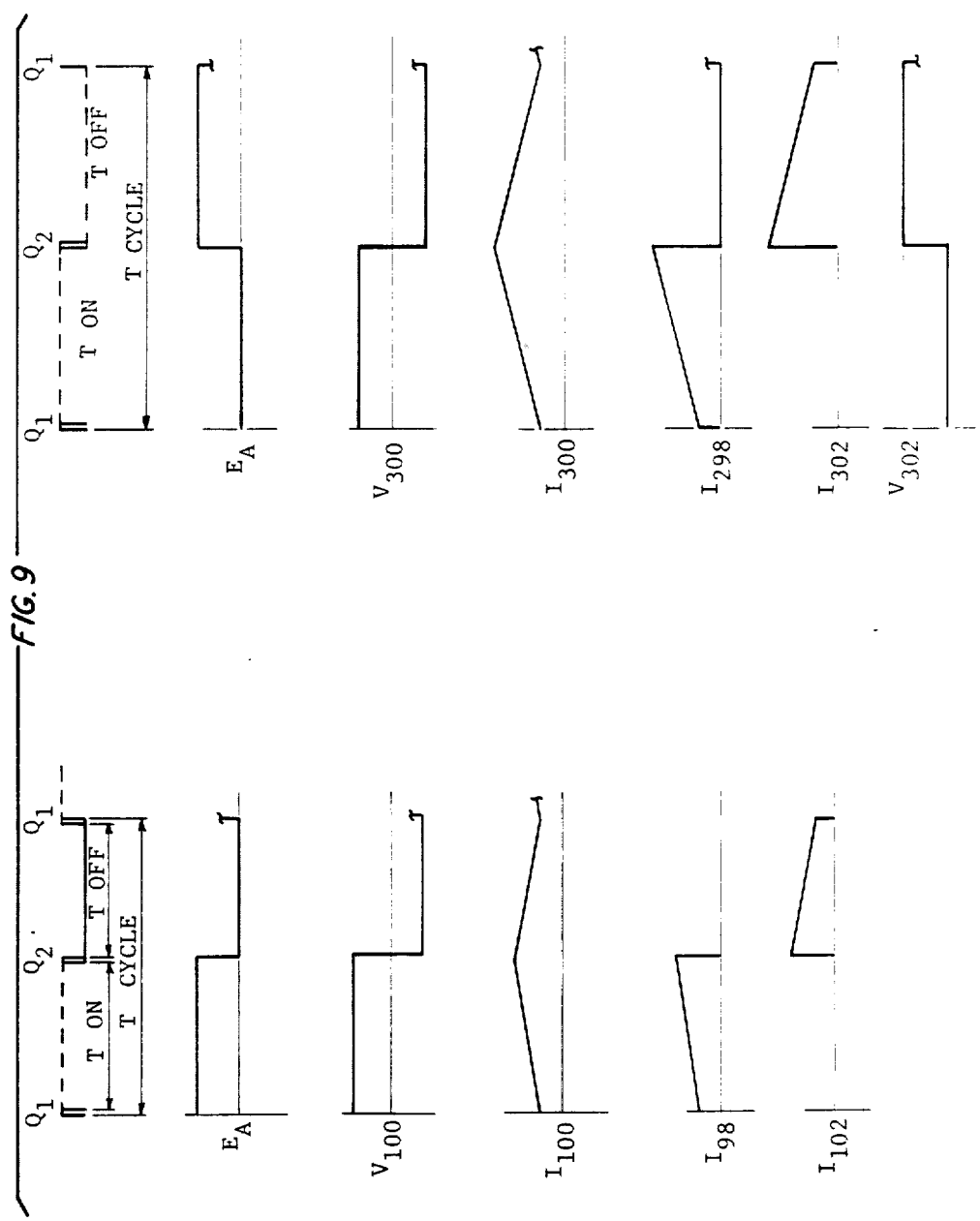
FIG. 9 is a graphical representation illustrative of wave forms used to explain the operation of the direct current converter shown in FIG. 5 and FIG. 6. with reference to the wave forms shown in FIG. 8.

FIG. 3 is a diagrammatic representation showing the relationship between the electrolysis cell 12, the fuel cell 14 and the direct current regulator 15 which is responsive to the output power of the fuel cell. The direct current regulator includes the direct current converter 16 and the control means 17. An example of a control means is a microcomputer having analog to digital signal converters which develops a duty cycle response of two preselected parameters. The control means develops a duty cycle signal for the converter. For example, the duty cycle may be set as a result of a difference between the actual current $I_3$ flowing from the regulator in comparison with a desired current or might be set as a function of the voltage of the electrochemical cell and the actual voltage of the fuel cell. As shown in FIG. 8 and FIG. 9, the duty cycle signal may be sent to the regulator in the form of a plurality of energizing gate signals to gated switch means. In addition, the control means has the capability of energizing components in the direct current converter during start up operations.

Figure 4:
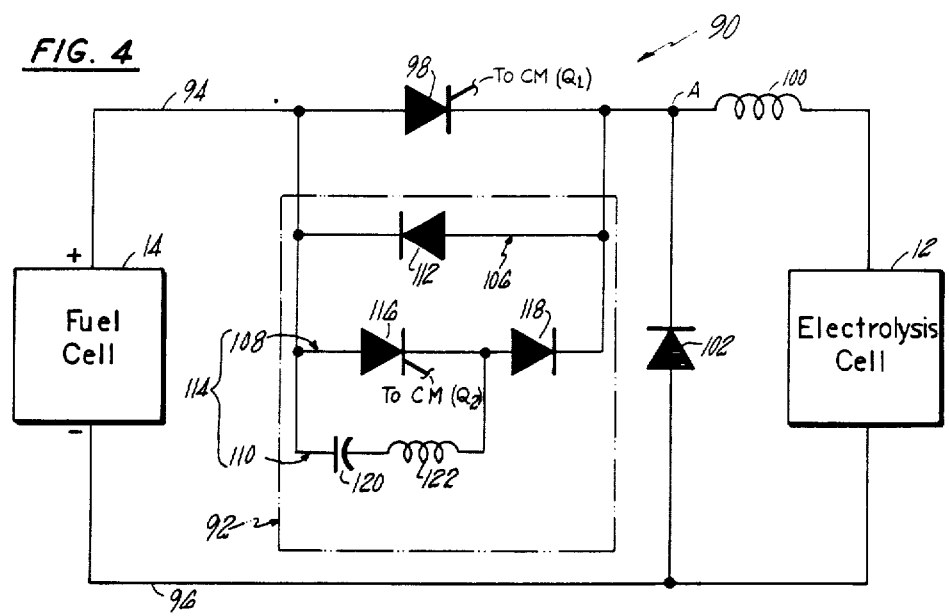
FIG. 4 is a schematic illustration of one embodiment of a direct current converter used in regulating electrical power between the fuel cell and the electrochemical cell.

FIG. 4 is a schematic illustration of one embodiment of the direct current converter 16. This particular direct current converter is a bucking regulator which decreases the voltage through the regulator. The bucking regulator has a first circuit 90 and a second circuit 92. The second circuit is enclosed in broken lines. The first circuit has a first leg 94 extending between the fuel cell and the electrolysis cell and a second leg 96 extending between the fuel cell and electrolysis cell. The first leg includes a first gated switch, such as a first thyristor 98 responsive to a gate signal $Q_1$ from the control means 17. The first leg includes an inductor 100 which is connected to the cathode of the first thyristor and which is in series with the first thyristor between the first thyristor and the electrolysis cell. The first leg has a point A between the first thyristor and the inductor 100. The first leg includes a means to enable the flow of current to the electrolysis cell through the inductor 100 during the period of time said first gated switch is in the nonconducting position and to oppose the divergence of the flow of current from the electrolysis cell to ground through point A between the first thyristor 98 and the inductor 100. In the embodiment shown, the means is the diode 102; the diode is connected at point A between the first thyristor and the inductor in the first leg such that the cathode of the diode is joined to the cathode of the first thyristor 98. The anode of the diode 102 is connected to the second leg.

The second circuit 92 includes a first leg 106, a second leg 108 and a third leg 110. The first leg has a parallel diode 112 extending in parallel across the first thyristor 98 of the first circuit 90. The anode of the parallel diode is connected to the cathode of the first thyristor. A pulse means 114 for creating a current is formed by the second leg and the third leg. The second leg extends in parallel across the first thyristor. The second leg has a second gated switch means, such as the second thyristor 116 and a diode 118. The second thyristor 116 is responsive to a gate signal $Q_2$ from the control means 17. The diode 118 has a cathode connected to the cathode of the first thyristor 98. The diode has an anode connected to the second thyristor 116. The second thyristor 116 has an anode connected to the anode of the first thyristor 98. The third leg is connected in parallel from the anode side of the first thyristor 98 to the cathode side of the second thyristor 116. The third leg includes a capacitor 120 for storing charge and an inductor 122. The capacitor has one side connected to the anode side of the first thyristor 98 and a second side connected to the inductor 122 and connected through the inductor to the cathode side of the second thyristor 116.

Figure 5:
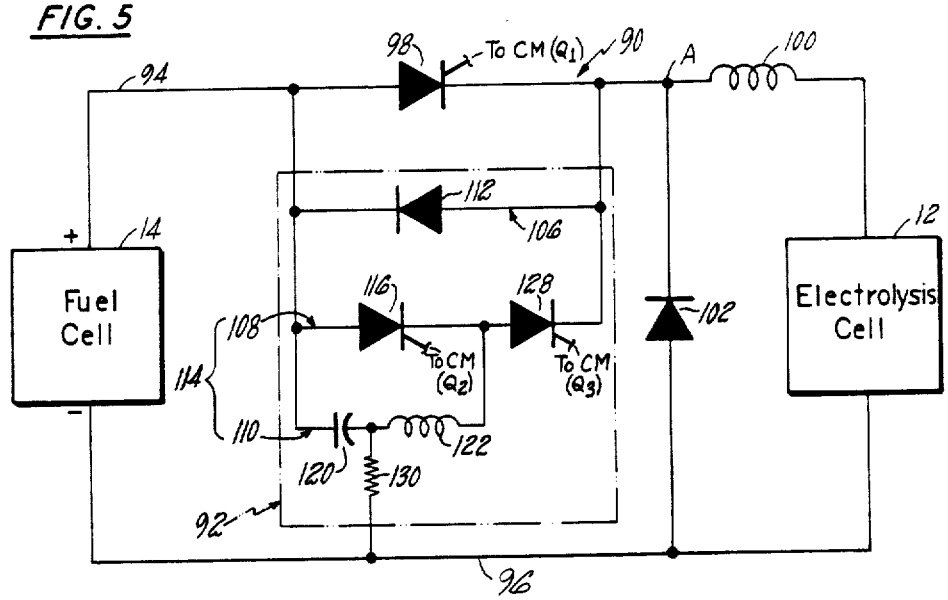
FIG. 5 is a schematic illustration of a second embodiment of a direct current converter used in regulating electrical power between the fuel cell and the electrochemical cell.

FIG. 5 is an alternate embodiment of the bucking regulator shown in FIG. 4 with two modifications to the second circuit 92. The first modification is the substitution of a third gated switch means, such as the third thyristor 128, for the diode 118. The third thyristor 128 is responsive to a gate signal $Q_3$ from the control means 17. The second modification is the addition of a resistor 130 which extends from a point between the capacitor 120 and the inductor 122 in the third leg to the second leg of the first circuit 96.

Figure 6:
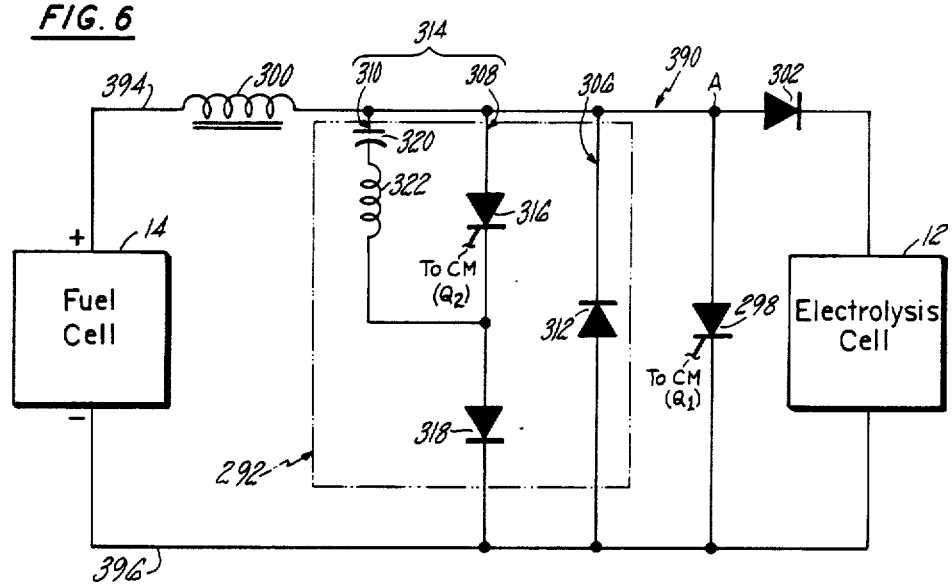
FIG. 6 is an alternate embodiment of the device shown in FIG. 4.

FIG. 6 is a schematic illustration of another embodiment of the direct current converter 16. This particular direct current converter is a boosting regulator which increases the voltage through the regulator. The boosting regulator has a first circuit 390 and a second circuit 292. The second circuit is enclosed in broken lines. The first circuit has a first leg 394 extending between the fuel cell and the electrolysis cell and a second leg 396 extending between the fuel cell and electrolysis cell. The first leg includes a first gated switch, such as a first thyristor 298 responsive to a gate signal $Q_1$ from the control means 17. The first thyristor has an anode connected to the first leg and a cathode connected to the second leg. The first leg includes an inductor 300 which is connected to the anode of the first thyristor. The first leg has a point A between the first thyristor 298 and the inductor 300. The inductor 300 is between point A and the fuel cell. The first leg includes a means to enable the flow of current to the electrolysis cell through the inductor 300 during the period of time said first gated switch is in the nonconducting position and to oppose the divergence of the flow of current from the electrolysis cell to ground through point A between the first thyristor 298 and the inductor 300. In the embodiment shown, the means to enable and to oppose is a diode 302 having an anode connected at point A between the first thyristor and the inductor in the first leg and having a cathode connected directly to the electrolysis cell by the first leg. Thus, the diode 302 is between point A and the electrolysis cell.

The second circuit 292 includes a first leg 306, a second leg 308 and a third leg 310. The first leg has a parallel diode 312 extending in parallel across the first thyristor 298 of the first circuit 390. The anode of the parallel diode 312 is connected to the cathode of the first thyristor. A pulse means 314 for creating a current is formed by the second leg and the third leg. The scond leg extends in parallel across the first thyristor. The second leg has a second gated switch means, such as the second thyristor 316, and a diode 318. The second thyristor 316 is responsive to a gate signal $Q_2$ from the control means 17. The diode 318 has a cathode connected to the cathode of the first thyristor 298. The diode 318 has an anode connected to the cathode of the second thyristor 316. The second thyristor 316 has an anode connected to the anode of the first thyristor 298. The third leg is connected in parallel from the anode side of the first thyristor 298 to cathode side of the second thyristor 316. The third leg includes a capacitor 320 for storing charge and an inductor 322. The capacitor has one side connected to the anode side of the first thyristor 298 and a second side connected to the inductor 322. The second side is also connected through the inductor to the cathode side of the second thyristor.

Figure 7:
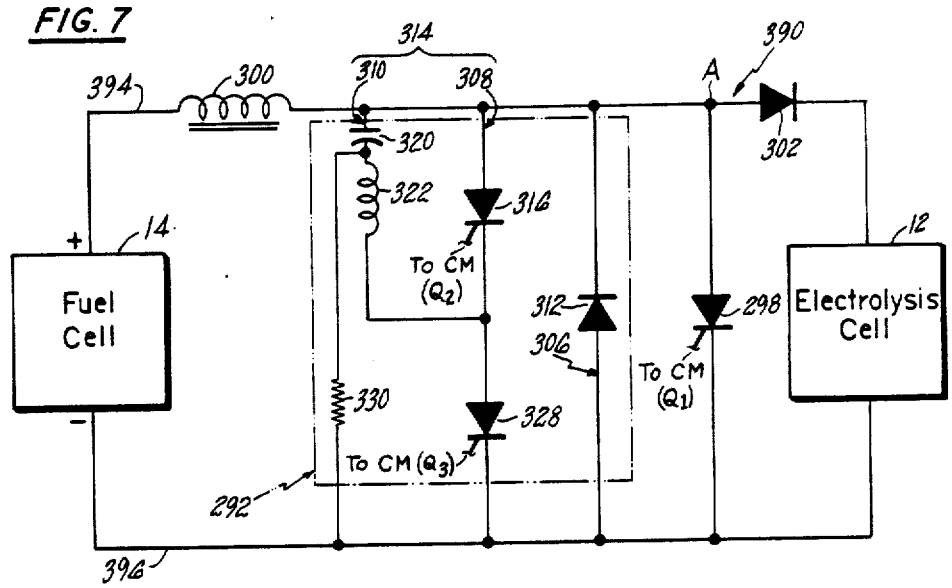
FIG. 7 is an alternate embodiment of the device shown in FIG. 5.

FIG. 7 is an alternate embodiment of the boosting regulator shown in FIG. 6 with two modifications to the second circuit 292. The first modification is the substitution of a third gated switch means, such as the third thyristor 328, for the diode 318. The third thyristor is responsive to a gate signal $Q_3$ from the control means 17. The second modification is the addition of a resistor 330 which extends from a point between the capacitor 320 and the inductor 322 in the third leg of the second circuit to the second leg of the first circuit 396.

Operation of these different embodiments of the regulator is illustrated by the wave forms shown in FIG. 8 and FIG. 9. These wave forms are a simplified representation for clarity of the complex wave forms that occur during operation. They are simplified for purposes of explanation.

These wave forms include the $Q_1$ wave form which is a control wave form generated by the control means. The $Q_1$ wave form is applied to the gate of thyristor 98. If the voltage at the anode is positive with respect to the cathode, the thyristor $Q_1$ conducts when the positive voltage $Q_1$ is applied gate to cathode. The second wave form is the voltage change across thyristor 98 from the anode to the cathode. The third wave form is the voltage with respect to ground $E_A$ at point A in the circuit. The fourth wave form is the current $I_{98}$ through the first thyristor 98. The wave form $I_{100}$ is the current through the inductor 100 and is a measure of the current supplied to the electrochemical cell. The wave form $I_{102}$ is the current through the diode 102. The wave form $Q_2$ is a control wave form from the microcomputer and is applied as a positive pulse to the gate of thyristor $Q_2$. At the time of application, $Q_2$ is a measure of the voltage from gate to cathode of the thyristor. The wave form $I_{116}$ is the current flowing through the second thyristor 116. The voltage $V_{120}$ is the voltage relative at point C at the side of the capacitor 120 joined to the anode of the first thyristor and to a measure of the voltage across the capacitor 120. The wave form $I_{118}$ is the current through diode 18. Superimposed on $I_{118}$ is a line showing the current $I_{100}$ flowing at the same point in time through the inductor 100. The current $I_{112}$ is the current through the diode $D_{112}$.

During operation of the apparatus 10, brine is fed from the brine mixer via conduit 36 to the anode side of the electrolysis cell. The chlorine, present as chloride ion in the solution, forms chlorine according to the reaction: $2Cl^- \rightarrow Cl_2 + 2e$. The alkali metal ion and its water of hydration pass through a permionic membrane to the cathode side 32 of the electrochemical cell. The water may be fed both externally into the cathode side or fed as water of hydration passing to the cathode side. The cathodic reaction is $H_2O + e^- \rightarrow OH^- + \frac{1}{2}H_2$. The chlorine gas evolved is sent to a chlorine washer via conduit 44 where the chlorine gas is mixed with water to remove contaminants. Wash water discharged from the chlorine washer 52 is flowed to the stripper 50 for chlorine where the water is mixed with low pressure steam. The overall requirement for fuel for the process is reduced if low pressure steam is recirculated from the fuel cell to transfer heat from the fuel cell to the electrical chemical process. After processing the water discharged from the chlorine washer through the stripper, the cleaned water is discharged from the process. The water may be recycled to the process or dumped.

The on-site steam boiler 56 provides high pressure steam to the vacuum evaporator where sodium hydroxide solution from the cathode is treated by evaporation. The resultant solution is approximately fifty percent (50%) by weight sodium hydroxide. The hydrogen gas evolved at the cathode is sent to a hydrogen washer which removes containments from the hydrogen gas. The water is discharged from the hydrogen washer and the product hydrogen is sent via conduit 80 to the fuel cell 14 for consumption of at least a portion of the hydrogen in the fuel cell.

In an alternate embodiment, conventional fuel may be treated by a fuel processor 82 to provide additional hydrogen to the fuel cell. If enough hydrogen is provided to the fuel cell the process can dispense with the use of additional DC power. It is expected that the most efficient operation of the fuel cell of the overall process will result in the maximum possible consumption of the product hydrogen in the fuel cell to provide electrical energy to the electrolysis cell and to decrease the reliance of the process on purchased AC electric power from an outside source.

The electrochemical cell uses electrical power at a predetermined voltage and a predetermined current to produce the chemical product. Depending on the number of electrochemical cells which are grouped together and the configuration of the individual cells, this predetermined voltage and current results in a requirement of a first voltage $V_1$ and a first current I for the electrochemical cell stack.

Each fuel cell utilizes fuel and oxidant to supply electrical power at a second current and a second voltage. These voltages $V_1$ and $V_2$ and currents $I_1$ and $I_2$ are selected to optimize the performance of the overall process. Normally the fuel cell will be operated within a band of voltages which represents the optimum conditions for the individual fuel cell in terms of life, efficiency and economics. For acid fuel cells this band has been found to lies between a lower limit of fifty percent (50%) of the open circuit voltage and an upper limit which is equal to sixty-five percent (65%) of the open circuit voltage of the individual fuel cell. Similar ranges have been established for aklaline and molten carbonate fuel cells. Preliminary estimates have established the following ranges: for molten carbonate fuel cells fifty percent (50%) to sixty-five percent (65%) of the open circuit voltage; for alkaline fuel cells the range is equal to seventy percent (70%) to eighty percent of the open circuit voltage. In some situations it may be desirable for reasons not connected with efficiency or with durability of the fuel cell to operate the fuel cell at voltages which are different from the band of predetermined values for the fuel cell or for the band of balues for the fuel cell which results in the most efficient operation of the process.

Placing the individual cells in series to form a stack and placing the stacks in parallel to provide additional current results in a utilization of fuel and oxidant which produces electrical power at a second voltage $V_2$ and a second current $I_2$. After regulating the direct current power by passing the power through the direct current converter, a current $I_3$ is supplied to the electrochemical cell at voltage $V_3$ which matches the voltage $V_1$. Purchased electrical power supplied by the rectifier at a current $I_4$ is supplemented by the current $I_3$ and, under certain operating conditions, may be replaced entirely by the current $I_3$ resulting in the disconnection of the AC power supply from the circuit. In those cases the current $I_3$ will equal $I_1$. Under operating conditions in which the electrical power is also provided by the rectifier, the current $I_1$ will be the summation of the current $I_3$ and $I_4$.

As shown in FIG. 3, the direct current converter 16 is designed to intermittently pass electrical current. The amplitude of the output current is the weighted average of the current intermittently flowing through the direct current converter. This amplitude is a function of the duration of time during which current is allowed to pass through the direct current converter during any given period of time. The period of time current flows as a percentage of the given period of time is called the duty cycle. Thus a fifty percent duty cycle results in the passage of current for fifty percent of any period of time. As discussed earlier, the duty cycle is established in response to input signals which establish an error signal. The control means 17 uses these signals to determine the length of time between a pulse $Q_1$ turning on the direct current converter to allow the direct current converter to pass current and a pulse $Q_2$ turns off the direct current converter. The length of time from the first pulse to the subsequent pulse $Q_1$ which turns on the current converter is the period of time used to calculate the duty cycle. If the current converter is acting as a voltage regulator, the input signals will be the output voltage of the current converter and the desired voltage which may be sent by an operator or automatically which may be automatically established by the system. As a result of the error signal. A duty cycle is established and the current converter is operated to provide a variable resistance by intermittently passing current through the regulator. Finally, a duty cycle will be reached which results in a zero error.

Alternatively, and most preferably, the direct current converter acts as a current regulator sensing the output current on the regulator and establishing an error signal in response to a desired current. The control means determines the error between the desired current and the actual current establishing a new duty cycle for the current converter and adjusting the duty cycle of the current converter until the correct current as an output is established. The desired current may be set, for example, to consume all of the hydrogen which is being produced by the electrochemical cell in which case the microcomputer may sense the hydrogen input to the fuel cell (e.g., signal F) and use a lookup table to determine the output current of the fuel cell. Then, using the voltage available from the electrochemical cell the microcomputer will determine the current which must be delivered by the converter. Any increase in hydrogen output is accompanied by an increase in the amount of current that can be delivered and the concomitant decrease in the electrical power purchased until the total power going to the electrolysis cell satisfies the operating requirements of electrolysis cell. In one embodiment additional hydrogen is produced by processing fuel through a fuel processor such that the maximum current available from the fuel cell to the electrolysis cell satisfies the electrolysis cell so that no additional electrical power need be purchased.

During operation of the buck regulator, the anode side of thyristor $98_1$ has a voltage which is equal to the voltage supplied by the fuel cell $E_{fc}$. As shown in FIG. 8, during the time thyristor 98 is in the off position, the anode is positive with respect to the cathode as is shown by the waveform $V_{98}$. The waveform $Q_1$ describes the pulses which are placed on the gate of thyristor 98 and the gate to cathode voltage of thyristor 98. At time equal zero, the $Q_1$ waveform or control waveform is a pulse which is a step function having a width of some microseconds. The pulse is applied gate to cathode and causes the thyristor 98 to conduct. The voltage $V_{98}$ across the thyristor goes to zero because once the thyristor is in conduction, the voltage drop across the thyristor is essentially zero. By placing the positive pulse on the gate of the thyristor, a positive voltage from gate to cathode results and the thyristor becomes conducting because the voltage from the anode to the cathode was positive.

At point C on the positive side of the capacitor, the capacitor is charged up with some positive voltage $E_f+_c$ which is greater than the voltage $E_{fc}$ ($E_f+_c > E_{fc}$). The summation of the current $I_{98}$ through the first thyristor and the current $I_{102}$ through the diode 102 of the first circuit is equal to the current $I_{100}$ supplied through the inductor 100 to the load which is the electrolysis cell. Before the thyristor 98 is turned on by the pulse $Q_1$ at time equal to zero, the current through the thyristor $Q_1$ is equal to zero ($I_{98}=0$, $T<0$). The current $I_{100}$ through the load is decreasing from some high valve. The current $I_{102}$ is equal to the current $I_{100}$. As the thyristor 98 is turned on, the load current $I_{100}$ starts to increase, the thyristor current rapidly increases to a value equal to the current through $I_{102}$ and the current through $I_{102}$ goes back to zero. In effect, as thyristor 98 is turned on, the current fed to the electrolysis cell is transferred from being fed from the diode 102 to being fed from the thyristor $Q_1$. The inductor 100 ensures that the current $I_{100}$ does not change instantaneously but rather acts to retard the instantaneous increase in current and acts as a means to resist changes in current to the electrochemical cell. The slopes of the changing currents in the thyristor and the diode are not instantaneous but are nearly so. The curves as drawn to approximate a perfect switch having instantaneous response, but as will be realized, there is some small slope which has been eliminated for clarity.

Once the thyristor 98 begins conducting, the thyristor 98 will conduct until the thyristor is made nonconducting. For the thyristor 98 to conduct current intermittently, the thyristor must stop carrying current. Accordingly, a second circuit 92 is provided to turn off the thyristor. This process is referred to as commutation. Commutation is begun by sending a control waveform $Q_2$ to the gate of thyristor 116 and causing a positive voltage to exist between the gate and the cathode. The voltage across the capacitor through the thyristor 116 is positive and as a result of the control waveform $Q_2$, a pulse of current $I_{116}$ begins to flow as shown in FIG. 8.

The time scale for these waveforms is very expanded to show the approximate shape of the waveform. In actual operation these waveforms appear almost as pulses. As the current $I_{116}$ flows to the capacitor 120 the voltage $V_{120}$ at point C decreases rapidly from the positive voltage $E_f+_c$ to a negative voltage $-E_f+_c$. The components in the second circuit such as the diode 118 and the inductor 122 are sized such that the capacitor will fully charge in a reverse polarity from the polarity that existed at a time just before $Q_2$. Thus, the circuit rings around upon itself, fully charging the capacitor before the capacitor 120 begins to discharge through the diode 118. As the capacitor discharges, a current $I_{118}$ is generated. $I_{118}$ is the commutation current is generated.

As the pulse of current $I_{118}$ comes out of the capacitor through diode 118 and moves toward point A, the current $I_{98}$ goes to zero. One way describing the commutation is the current flowing from the fuel cell to the first thyristor 98 seeks to go to point C which is no at $-E_f+_c$ and does not flow to point A which is at a voltage equal to $E_f+_c$. Thus, the current $I_{98}$ is shunted and replaced by a portion of the current $I_{118}$. Alternatively, the process may be described as the production of a pulse of current through diode 118 which may go through diode 112 or towards point A. The current $I_{100}$ is still building up, and, as the large pulse of current $I_{118}$ approaches point A, the inductor prevents an instantaneous increase in the current. As a result, the current $I_{98}$ no longer flows, the current $I_{100}$ is replaced by a portion of the current $I_{102}$ and the remainder is passed through diode 112 as $I_{112}$. As can be seen, $I_{112}$ is a very small pulse of current that returns to charge the capacitor 120 at a voltage $E_f+_c$. As the pulse of current $I_{118}$ moves through point A and through diode 112 (with the thyristor $Q_1$ in a nonconducting position), the diode the first circuit beings to pass a current $I_{102}$ to supply the current $I_{100}$ to the electrolysis cell. The magnitudes of $I_{102}$ and $I_{100}$ are equal and the current $I_{98}$, which was building up at this point in time, now returns to zero. The voltage $E_a$ goes back to zero and the voltage across the thyristor goes back to positive. As a result, a negative voltage exists across the inductor and is equal to minus V load which is the voltage dropped across the electrolysis cell.

In summary, as a current passes through diode 112 during the time current $I_{118}$ is greater than $I_{100}$. The interval when diode 112 conducts and $I_{98}$ is zero is the commutation time for thyristor 98. As $I_{118}$ drops to the value of $I_{100}$, diode 112 no longer conducts. Current now flows from fuel cell through the inductor 122, capacitor 120, diode 118 and the filter reactor to the load.

FIG. 9 summarizes several of the voltages and currents in the first conduit for the buck and boost regulators. The cycle for the buck regulator $T_c$ ($T_c = T_{cycle}$) includes a period $T_{on}$ during which the thyristor 98 (switch) is in the "on" position and conducting and a period of time $T_{off}$ during which the thyristor 98 is not conducting. Because the cycle time $T_c$ is very great compared to the pulse time it takes for the thyristor to turn off when the pulse $Q_2$ arrives at thyristor 116, the pulses $Q_1$ and $Q_2$ are shown as spikes coinciding with the on and off period for the thyristor 98. When the thyristor 98 is on, point A has a voltage $E_A$ which is equal to the voltage $E_{fc}$ neglecting any small circuit losses that might exist. When the thyristor switch 98 is off, point A has a voltage $E_A$ which is equal to zero ($E_A = 0$). The current $I_{100}$ is increasing during the period of time the switch is on and is decreasing during the period of time the switch 98 is off. The current $I_{100}$ is the summation of the current $I_{98}$ through the thyristor switch and the current $I_{102}$. The current $I_{102}$ is zero during the period of time that the thyristor switch 98 is on and is decreasing from some preselected value during the period of time when the switch is off. The current $I_{98}$ through the thyristor switch 98 is increasing during the on period and is decreasing from its maximum value during the off period. As can be seen, the pattern for the current $I_{100}$ is one of developing a triangular current where the rising portion is being carried by the switch 98 and the falling portion is being carried by the diode 102.

The voltage $V_{100}$ across the inductor is equal to the inductance multiplied by the first derivative of the current with respect to time ($V_{100}=I_{nd} \cdot di/dt$). The voltage drop is positive during the period of time when the switch is on. The voltage drop is equal to the voltage at point A minus the voltage across the load. As can be seen, the positive voltage is less than the voltage supplied by the fuel cell. The voltage drop $V_{100}$ across the inductor 100 is negative during the period of time when the switch is off being equal to the negative of the load voltage.

In summary we have a switch means which is the thyristor 98, a means to resist changes in current through the primary circuit which is the inductor 100 and a means to maintain the current flowing in the means to resist changes in current which is the diode 102. The second circuit 92 is a means to turn off the switch means by generating a current pulse that is greater than the current flowing through the means to resist changes in current, inductor 100.

The boost regulator works in a similar fashion to the buck regulator but, instead of the voltage being lower than the source (the fuel cell voltage), the voltage is higher as a result of the orientation of the components. The commutation or second circuit 292 for the boost regulator works in the same fashion as the commutation circuit described above for the buck regulator.

As with the buck regulator, the pulse signals $Q_1$ and $Q_2$ to the first thyristor switch 298 and the second thyristor switch 318 determine the period during which the thyristor 298 conducts and the period during which the thyristor switch 98 does not conduct. The voltage $E_a$ at point A is pulled to ground ($E_a=0$) during the period of time the thyristor switch 298 is "on" or conducting. The thyristor 298 acts as a short circuit. The voltage $E_a$ at point A is equal to the voltage $E_{fc}$ of the fuel cell source plus the voltage across the inductor $V_{300}$ (i.e., $E_a=E_{fc}+Ind \cdot di/dt$). Although the voltage across the inductor 300 is negative during the period when the switch is in the on position, the voltages $E_A$ at point A is zero when you turn the switch on. Thus the voltage across $V_{300}$ is as shown, staring negative when the switch is on and going positive when the switch is off. The current $I_{300}$ through the inductor 300 increases during the period of time when the switch is on and decreases during the period of time the switch off. The voltage $V_{302}$ across the diode in the first circuit is negative and is equal to the voltage of the electrochemical cell $V_{load}$ because the diode 302 is blocking the flow of current through the electrochemical cell. Thus, the current is being shunted through the first thyristor switch 298 with the result that the current $I_{302}$ flowing through the diode is equal to the current $I_{load}$ through the electrochemical cell is discontinuous. Thus, the inductor 300 in the boost regulator acts as an intermediate storage of electrical energy because the output voltage is greater than the input voltage. In the buck regulator the inductor 100 acts as a filler to provide a continuous source of current to the electrochemical cell. In summary, the buck regulator has a discontinuous source of current resulting in a continuous output of current and in the boost regulator the source of current is continuous and the output current is discontinuous. This continuous current may be a source of AC ripple in the electrolysis cell by placing a plurality of boost regulators in parallel, this effect will be decreased.

The second commutation circuit in the boost regulator and the buck regulator work the same in both circuits. In both circuits you gate the commutation thyristor 116,316 by producing a pulse of current $Q_2$ from microcomputer. As a result of the discharge of the capacitor 120,320 and the re-recharging of the capacitor with reverse polarity, a buck current flows and forces the current through the switch thyristor 98, 298 to zero with the excess current flowing back into the capacitor and the rest going to replace the output current of the thyristor. Thus, the commutation circuits are the same in both the buck regulator and the boost regulator.

FIGS. 5 and 7 shows an improved design of the buck regulator and the boost regulator includes the two improvements mentioned earlier. The first improvement is a resistor for the current to charge the capacitor 120,320. This enables an operator to be sure that sufficient charge exists on the capacitor for the capacitor to provide a source of current for commutation. In cases where the resistor is not employed as is shown in the basic design of the buck regulator in FIG. 4, the microcomputer might be programmed to supply an initial charge to the capacitor to ensure that a sufficient charge on the capacitor exists during start-up operation. As will be realized, the conern for the intial charge on the capacitor is a concern during start-up operations but is not once either regulator is running.

The second improvement to both the buck regulator and the boost regulator is replacing the diode 118,318 in the commutation circuit with a thyristor 118,318. In both the buck regulator and the boost regulator shown in FIG. 5 and FIG. 7, the control signal $Q_2$ causes the capacitor to ring and charge before it can discharge into the diode. Thus, before you actually turn the current off through the switch thyristor 98,298, you must wait for the capacitor to charge. By replacing the diode with a second thyristor 128,328 in you can initial the charging action earlier, in fact right after the signal $Q_1$, have the capacitor already charged so that it waits for a gate signal $Q_3$ to the third thyristor. As soon as the gate signal $Q_3$ reaches the thyristor $Q_3$, the thyristor discharges the capacitor and it enables you to save, for example, a hundred microseconds resulting in a finer control of the current through the direct current converter. If only a diode $D_2$ is in the circuit, than as soon as the capacitor reverses its polarity and reaches a full charge the capacitor will discharge through the diode.

As will be realized the direct current converter may consist of a plurality of boost regulators or buck regulators extending in parallel with each other between the fuel cell and the electrochemical cells. This will result in reduced probability for AC ripple in the electochemical cell when using a boost regulator. As will be appreciated, AC ripple is to be avoided if possible in electrochemical cells.

Although the invention has been shown and described with respect to detailed embodiments thereof, it should be understood by those skilled in the the art that various changes in form and detail thereof may be made without departing from the spirit and the scope of the claimed invention.

We claim:

1. A method for operating a first electrochemical fuel cell in combination with a second electrochemical cell which employs a direct current converter, the fuel cell consuming a fuel to produce electrical power, the second electrochemical cell producing a chemical product as a result of the consumption of electrical power, which comprises:

operating the electrochemical cell at a first current and at a first voltage to produce a chemical product;

operating the fuel cell to consume fuel and produce direct current electrical power at a second current and at a second voltage which is independent of the voltage of the electrochemical cell;

converting the power output of the fuel cell which is at the second current and the second voltage to a third current and an output voltage which matches the first voltage of the electrochemical cell by flowing current intermittently through a direct current converter; and, supplying the third current to the electrolysis cell to produce the chemical product.

2. The method as claimed in claim 1 wherein the step of operating the electrochemical cell includes the step of producing a fuel adapted for use in the fuel cell and wherein the method includes the step of supplying the fuel to the fuel cell for consumption of at least a portion of the fuel in the fuel cell and wherein the step of converting the power output of the fuel cell includes the step of flowing current intermittently through the direct current converter in response to the output power of the fuel cell and the fuel available to the fuel cell.

3. The method as claimed in claim 2 wherein the electrochemical cell further includes components in flow communication with the electrochemical cell for producing the chemical product, wherein the electrochemical cell is a component for producing the chemical product, and wherein the method further includes the step of producing heat with the fuel cell and transferring the heat from the fuel cell to at least one of said components for producing the chemical product.

4. The method as claimed in claim 3 wherein the step of transferring heat from the fuel cell to at least one of the components for producing the chemical product includes the step of transferring heat from the fuel cell to water to make steam and flowing the steam to the component for producing the chemical product.

5. The method as claimed in claim 2 wherein the electrochemical cell is a first source of fuel and wherein a second source of fuel is in flow communication with the fuel cell, wherein the method includes the step of providing fuel from the second source to the fuel cell to supply the fuel cell with additional fuel.

6. The method as claimed in claim 1 wherein the fuel cell is capable of supplying a portion of the power to the electrochemical cell and wherein a means for supplying additional power to the electrochemical cell is in parallel with the fuel cell, wherein the method includes the further step of supplying additional power to the electrochemical cell from another source.

7. The method as claimed in claim 2 wherein the fuel cell is capable of supplying a portion of the power to the electrochemical cell and wherein a means for supplying additional power to the electrochemical cell is in parallel with the fuel cell, wherein the method includes the further step of supplying additional power to the electrochemical cell from another source.

8. The method as claimed in claims 5, 6 or 7 which includes the steps of establishing an upper limit and a lower limit on the voltage of the fuel cell and adjusting the power output from the fuel cell to maintain the voltage between the upper limit and the lower limit.

9. The method of operating the combined cells of claims 2, 5 or 6 wherein a direct current converter having a duty cycle to provide for the intermittent flow of current through the direct current converter is used to convert the power output of the fuel cell at the second current and at the second voltage to a third current and an output voltage, wherein the method includes the step of flowing current intermittently between the fuel cell and the electrochemical cell through the direct current converter during the duty cycle of the converter.

10. The method of operating the combined cells of claim 9 wherein the method further includes the steps of sensing the first voltage of the electrochemical cell, establishing a desired voltage for the electrochemical cell and establishing a voltage change across the direct current converter which is equal to the difference between the first voltage and the second voltage by adjusting the duty cycle of the direct current converter.

11. The method of operating the combined cells of claim 9 wherein the step of intermittently flowing current between the fuel cell and the electrochemical cell includes the steps of sensing the actual third current delivered by the direct current converter, establishing a desired amplitude for the third current and adjusting the duty cycle of the direct current converter to provide for the third current and to establish a voltage change across the direct current converter which is equal to the difference between the second voltage and the first voltage.

12. The method of operating the combined cells as claimed in claim 8 wherein the fuel cell employs an acid electrolyte and wherein the step of establishing an upper limit and a lower limit on the value of the voltage of the fuel cell includes the step of establishing a lower limit on the voltage of the fuel cell at fifty percent (50%) of the open circuit voltage of the fuel cell and the step of establishing an upper limit on the voltage of the fuel cell at sixty-five percent (65%) of the open circuit voltage of the fuel cell.

13. The method of operating the combined cells as claimed in claim 8 wherein the fuel cell employs molten carbonate as the electrolyte and wherein the step of establishing an upper limit on the value of the voltage and a lower limit on the value of the voltage of the fuel cell includes the step of establishing a lower limit on the voltage of the fuel cell at fifty percent (50%) of the open circuit voltage of the fuel cell and the step of establishing an upper limit on voltage of the fuel cell at sixty-five percent (65%) of the open circuit voltage of the fuel cell.

14. The method of operating the combined cells of claim 8 wherein the fuel cell employs a base as the electrolyte for the fuel cell and wherein the step of setting an upper limit and a lower limit on the voltage of the fuel cell further includes the step of setting the lower limit on the voltage of the fuel cell equal to seventy percent (70%) of the open circuit voltage of the fuel cell and the step of setting the upper limit on the voltage of the fuel cell equal to eighty percent (80%) of the open circuit voltage.

15. An apparatus for carrying out an electrochemical process which comprises:

an electrochemical cell which uses electrical power at a first voltage and a first current to produce a chemical product;

at least one fuel cell which utilizes a fuel and an oxidant supplied to the cell to produce electrical power at a second voltage and a second current; and, means for the intermittent flow of current through a direct current converter connected to the fuel cell and the electrochemical cell for regulating the electrical power received from the fuel cell to adjust the current and voltage supplied by the fuel cell so that the voltage change across said means is equal to the difference between the first voltage and the second voltage, said means being responsive to the electrical power of the fuel cell and in electrical communication with the electrochemical cell for delivering power from the fuel cell to the electrochemical cell to provide at least a portion of the electrical power required by the electrochemical cell to operate at said first voltage and said first current; wherein the means for regulating electrical power permits the fuel cell to operate at a second voltage which is different from the first voltage of the electrochemical cell to enable the fuel cell to operate at a desirable voltage for the fuel cell which is independent of the voltage for the electrochemical cell and to enable the electrochemical cell to operate at a desirable voltage and current for the electrochemical cell which is independent of the voltage and current for the fuel cell.

16. The apparatus as claimed in claim 15 wherein the electrochemical cell produces a fuel adapted for use in the fuel cell and wherein the apparatus includes means for supplying the fuel to the fuel cell for consumption of at least a portion of the fuel in the fuel cell and wherein the means for the intermittent flow of current through the direct current converter is responsive to the fuel available to the fuel cell.

17. The apparatus as claimed in claim 16 wherein the apparatus further includes components in flow communication with the electrochemical cell for producing the chemical product, wherein the electrochemical cell is a component for producing the chemical product, wherein the fuel cell produces heat and wherein the apparatus further includes means for transferring heat from the fuel cell to at least one of said components for producing the chemical product.

18. The apparatus as claimed in claim 16 wherein the electrochemical cell is a first source of fuel and wherein the apparatus includes a second source of fuel for supplying additional fuel to the fuel cell.

19. The apparatus as claimed in claim 15 wherein the fuel cell supplies a portion of the power to the electrochemical cell and wherein the apparatus further includes a means for supplying additional power to the electrochemical cell.

20. The apparatus as claimed in claim 16 wherein the fuel cell supplies a portion of the power to the electrochemical cell and wherein the apparatus further includes a means for supplying additional power to the electrochemical cell.

21. The apparatus as claimed in claim 18, 19 or 20 wherein the fuel cell has a schedule of desired operating voltages and wherein the fuel cell includes means for controlling the fuel cell voltage such that the voltage of the fuel cell lies within said schedule of desired operating voltages.

22. The apparatus as claimed in claim 18 or 20 wherein said fuel for the fuel cell is hydrogen.

23. The apparatus as claimed in claim 22 wherein said electrochemical cell is a chlor-alkali cell.

24. The apparatus as claimed in claim 16, 18 or 19 wherein the means for regulating the electrical power includes a direct current converter having a duty cycle to provide for the intermittent flow of current through the direct current converter.

25. The apparatus as claimed in claim 24 wherein the direct current converter has a variable duty cycle responsive to a duty cycle signal and wherein the means for regulating electrical power includes a second means for establishing the duty cycle of the direct current converter and for sending a duty cycle signal to the direct current converter in response to a first signal indicative of the desired amplitude of the first voltage of the electrochemical cell and a second signal indicative of the actual first voltage of the electrochemical cell.

26. The apparatus as claimed in claim 24 wherein the direct current converter has a variable duty cycle responsive to a duty cycle signal to establish an output third current and wherein the means for regulating electrical power includes a second means for establishing the duty cycle of the direct current converter and for sending a duty cycle signal to the direct current converter in response to a first signal indicative of a desired amplitude for the third current and a second signal indicative of the actual third current.

* * * * *